UNITED STATES PATENT OFFICE.

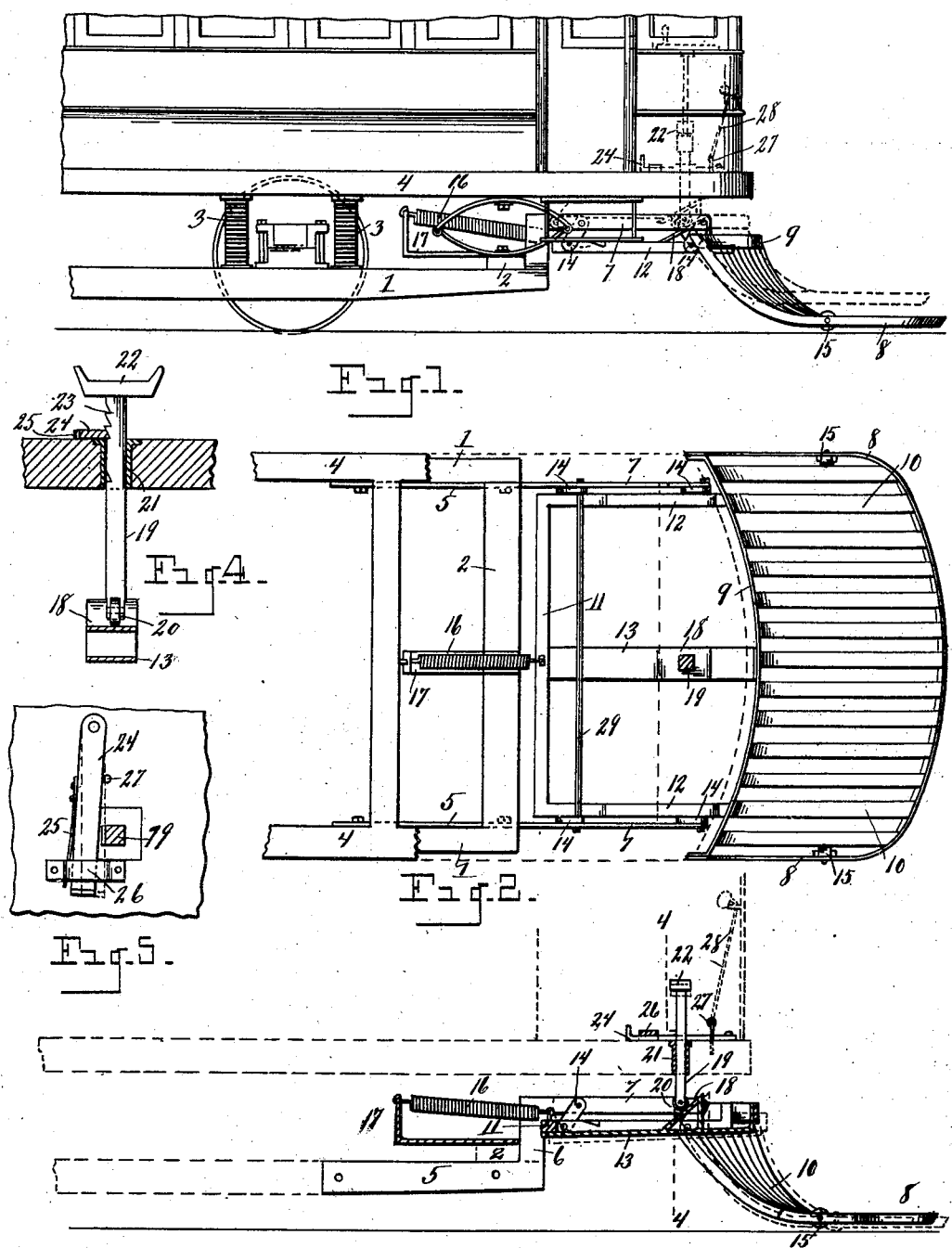

ALBERT FISCHER, OF DETROIT, MICHIGAN, ASSIGNOR OF ONE-HALF TO WALTER ROSS, OF DETROIT, MICHIGAN.

STREET-CAR FENDER.

SPECIFICATION forming part of Letters Patent No. 693,960, dated February 25, 1902.

Application filed March 16, 1901. Serial No. 51,471. (No model.)

*To all whom it may concern:*

Be it known that I, ALBERT FISCHER, a citizen of the United States, residing at Detroit, in the county of Wayne, State of Michigan, have invented certain new and useful Improvements in Street-Car Fenders; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to fenders for street-cars; and it consists in the construction and arrangement of parts hereinafter fully set forth, and pointed out particularly in the claims.

The object of the invention is to provide a fender for street-cars which is normally held yieldingly in place and in which the arrangement is such as to enable the motorman or operator to depress the fender onto the track when occasion demands and maintain said fender firmly in position when depressed to obviate the possibility of a person or object on the track passing under the fender in case of an accident, yet enabling the fender in its normal condition to yield or swing upwardly when encountering an obstruction, thereby preventing the breaking of the fender, as would result were the fender always maintained rigidly in place.

The above object is attained by the mechanism illustrated in the accompanying drawings, in which—

Figure 1 is a side view of the front portion of a car, showing the application of my improved fender. Fig. 2 is a plan view of the fender and frame to which it is attached, showing said frame mounted on the forward end of the truck-frame, said car-frame being broken away. Fig. 3 is a longitudinal section through the frame to which the fender is attached, showing the manner of mounting said frame on the brackets extending from the side bars of the truck-frame and the means for depressing the fender when desired, a portion of the car-frame appearing in dotted lines. Fig. 4 is a vertical sectional view in detail, as on line 4 4, of Fig. 3. Fig. 5 is a plan view in detail of the spring-actuated catch adapted to lock the vertically-movable plunger which actuates the fender, said plunger appearing in horizontal section.

Referring to the characters of reference, 1 designates the side bars of the truck-frame, whose forward ends are connected by the cross-beam 2. Mounted on the truck-frame, through the medium of the springs 3, is the car-frame 4, all of which parts are common and may be of any suitable construction.

Secured to the inner faces of the side bars 1 of the truck-frame are the angular brackets 5, having the vertical portions 6 and the forwardly-extending horizontal portion 7, to which the fender is attached. The fender may be of any suitable construction and is herein shown as composed of the curved outer rail 8, whose end portions bend upwardly and unite with the circle-bar 9, said circle-bar and rail being united by a number of curved cross bars or slats 10, forming the body of the fender.

The fender proper is rigidly attached to a trilateral frame 11, whose parallel side pieces 12 are attached at their forward ends to the extremities of the fender's circle-bar, the center piece or plate 13 of said frame being attached at its forward end to the center of said circle-bar.

The frame 11, carrying the fender, is yieldingly attached to the projecting ends 7 of the brackets 5 by means of the links 14, whose lower ends are pivoted to the side pieces of the frame 11 and whose upper ends are pivoted to the projecting ends of said brackets, whereby the frame 11 and the fender attached thereto are hung so as to swing upon said links. The length of the links 14 is such that when swung downward to a vertical position they will carry the fender downward and forward, so as to bring the antifriction-rollers 15, journaled in the rail of the fender, onto the track, as clearly shown by dotted lines in Fig. 3. To retract the fender and normally swing it upward slightly above the rails of the track, a coiled spring 16 is employed, whose forward end is attached to the frame 11 and whose rear end is secured to an angle-arm 17, mounted upon and projecting rearwardly from the cross-bar 2 of the truck-frame, whereby the tension of said spring is normally exerted to retract the frame 11 and swing the links 14 rearwardly, thereby maintaining the fender above the track, as shown by solid lines in Figs. 1 and 3.

Mounted upon the upper face of the plate 13 is an inclined plane 18. Adapted to move vertically in the frame of the car is a rectangular plunger 19, carrying in its lower end a roller 20, which bears upon the inclined plane 18. Said plunger is embraced within a square boxing 21, seated in the car-frame, and carries upon its upper end a footpiece 22, which projects upwardly into the vestibule or through the car-platform adjacent to the station of the motorman. When desiring to depress the fender, the motorman steps upon the footpiece 22, thereby forcing the plunger downward and causing the roller in the lower end thereof to engage the inclined plate 18 and swing the frame 11 downward and forward until the links 14 assume a vertical position, thereby carrying the fender downward adjacent to the rails of the track and causing the rollers 15 thereof to engage said track, in which position the fender may be firmly maintained by a continued application of pressure to the upper end of said plunger, obviating the possibility of the fender riding over a person or other object on the track and holding the fender so as to prevent anything from passing under it. Upon a release of the plunger 19 the spring 16 will swing the frame 11 rearwardly and raise the fender slightly above the track to its normal position.

Should it be desired to lock the fender down after it has been forced into contact with the track, provision is made therefor by forming in the side of the plunger notches 23, adapted to be engaged by a pivoted catch-plate 24, which is normally held against the face of the plunger by a spring 25, the outer end of said plate being adapted to move laterally within a keeper 26, which embraces it. When the plunger is depressed, so as to carry the notches 23 below the edge of said plate, they are engaged thereby and the plunger held in its depressed position until released by disengaging the catch 24 therefrom. Under ordinary conditions it is desirable to permit the plunger to have free vertical movement. Therefore the catch-plate 24 is normally held from contact with the plunger by a pin 27, as shown in Fig. 5. When desiring to use the catch-plate to maintain the plunger depressed, the motorman withdraws the pin 27 by pulling upward upon the chain 28, attached to said pin.

In the common manner of mounting the car-frame upon the trucks there is considerable vertical movement to the ends of the car owing to the yielding of the springs upon which the car-frame is supported, and where the fender is mounted upon the car-frame it is subject at times to a high degree of vertical movement as the body of the car rocks or oscillates It is impossible, therefore, to provide for maintaining the fender always close to the track if mounted upon the frame of the car. By attaching the fender and its supporting-frame to the frame of the truck an unvarying relation may be maintained between the fender and track, so that the fender may be depressed and held close to the track without regard to the position or movement of the frame of the car, as the fender is entirely independent of the car-frame. It is therefore possible to mount the fender upon the truck-frame so that it will normally stand very close to the track and requires but a slight movement to depress it and hold it in contact therewith in case of accident by the application of pressure to the upper end of the plunger 19.

The rear links are pivoted upon a transverse rod 29, whose opposite ends pass through the extended end portions 7 of the brackets 5, whereby said brackets are tied together by said rod, which at the same time affords a pivot for the links 14.

Having thus fully set forth my invention, what I claim as new, and desire to secure by Letters Patent, is—

1. In a car-fender, the combination of a car, or vehicle, a fender mounted thereon to have a slight vertical and longitudinal movement, an inclined plane upon the fender-frame, a vertically-movable plunger engaging said inclined plane and adapted by its downward movement to depress the fender, and a spring for retracting the fender after being depressed.

2. In a fender, the combination of the car or vehicle, a support mounted on the truck-frame of the car, a fender and frame, links pivoted to said support and to the fender-frame whereby said frame is freely suspended by said links to swing longitudinally of the truck-frame, means for actuating the fender and frame to carry the fender downwardly into contact with the track and hold it in said position and means for retracting the fender-frame when released.

3. In a car-fender, the combination with the truck-frame, of suitable supports mounted on the truck-frame, a movable frame, the fender attached to said movable frame, means connecting said movable frame with said supports to allow of a free swinging movement of said frame and fender longitudinally of the car, means for actuating the frame and fender to depress the latter and means for retracting the fender and frame when released.

4. In a car-fender, the combination with the truck-frame, of suitable supports mounted on the truck-frame, a fender-frame hung from said supports so as to maintain the fender normally adjacent to the track, means connecting the fender-frame to said supports to allow of a slight vertical and horizontal movement of said frame, an inclined plane mounted upon the fender-frame, a vertically-movable plunger engaging said inclined plane, whereby, by a movement of said plunger the fender-frame may be depressed, and means for retracting said fender-frame.

5. In a car-fender, the combination of the truck-frame, the fender, pivoted links connecting the fender with the truck-frame, said links depended vertically and being free to swing from a vertical position in both directions, a spring attached to the fender adapted to normally suspend it above the track, means for forcing the fender downwardly against the action of said spring and means for releasing the fender to permit the spring to raise it from its depressed position.

6. In a car-fender, the combination of a car, a fender-frame mounted thereon to normally swing freely below the platform of the car, means for depressing the fender-frame to carry the fender onto the track and lock the frame and fender against movement, and means for retracting the fender-frame upon its swinging support to carry the fender free from the track and normally maintain it in a condition of free suspension.

In testimony whereof I sign this specification in the presence of two witnesses.

ALBERT FISCHER.

Witnesses:
E. S. WHEELER,
C. E. JOSLIN.